US 7,660,557 B2

(12) United States Patent
Steelberg et al.

(10) Patent No.: US 7,660,557 B2
(45) Date of Patent: Feb. 9, 2010

(54) DYNAMIC SELECTION AND SCHEDULING OF RADIO FREQUENCY COMMUNICATIONS

(75) Inventors: Ryan Steelberg, Newport Beach, CA (US); Chad Steelberg, Newport Beach, CA (US)

(73) Assignee: Google Inc., Mountain View, CA (US)

(*) Notice: Subject to any disclaimer, the term of this patent is extended or adjusted under 35 U.S.C. 154(b) by 944 days.

(21) Appl. No.: 11/130,655

(22) Filed: May 16, 2005

(65) Prior Publication Data

US 2006/0020965 A1    Jan. 26, 2006

Related U.S. Application Data

(63) Continuation-in-part of application No. 10/898,022, filed on Jul. 23, 2004, and a continuation-in-part of application No. 10/898,011, filed on Jul. 23, 2004.

(51) Int. Cl.
*H04H 40/00* (2008.01)
(52) U.S. Cl. ........................... 455/3.06; 455/69
(58) Field of Classification Search ............ 705/14; 455/3.06, 7, 3.05, 3.01, 69
See application file for complete search history.

(56) References Cited

U.S. PATENT DOCUMENTS

2003/0216958 A1* 11/2003 Register et al. ............... 705/14

* cited by examiner

*Primary Examiner*—Tu X Nguyen
(74) *Attorney, Agent, or Firm*—Fish & Richardson P.C.

(57) ABSTRACT

A manager for playing of broadcast specific information is disclosed. The manager for playing of broadcast specific information includes a managing node that is at least partially resident at a radio broadcast point, wherein the managing node includes a plurality of inputs for receipt of the broadcast specific information from at least two sources, wherein the hub records the broadcast specific information entering at least two of the plurality of inputs for eventual broadcast from the radio broadcast point, and at least one broadcast non-specific information input associated with the managing node, wherein at least one of a format, play time, and play type of the broadcast specific information are varied in accordance with the broadcast non-specific information, and wherein the varied broadcast specific information is broadcast from the radio broadcast point.

9 Claims, 3 Drawing Sheets

DYNAMIC SELECTION AND SCHEDULING OF RADIO FREQUENCY COMMUNICATIONS

CROSS REFERENCE TO RELATED APPLICATIONS

This application is a continuation-in-part under 35 U.S.C. §120 of U.S. application Ser. No. 10/898,011, filed Jul. 23, 2004, entitled "Dynamic Creation, Selection, and Scheduling of Radio Frequency Communications," and is a continuation-in-part under 35 U.S.C. §120 of U.S. application Ser. No. 10/898,022, filed Jul. 23, 2004, entitled "Dynamic Selection and Scheduling of Radio Frequency Communications," which applications are hereby incorporated by reference herein as if set forth in their entirety.

BACKGROUND OF THE INVENTION

1. Field of the Invention

The field of the invention is radio frequency communications.

2. Description of the Background

Transmission of data via radio signals is an effective means of communication to a variety of devices located within range of the signal. An advertiser or other provider of the data (including content) may pre-select a radio frequency carrier type (e.g. FM sub-carrier, AM sub-carrier, Cellular etc . . . ), a broadcasting station (e.g. KUS FM), and/or a frequency over which the data will be broadcast (e.g. 102.7 MHz @57 kHz RBDS) based on the geographic location of the target audience. The particular frequency maybe chosen because of its popularity with the target audience, its spectrum availability, the type or device that will receive the signals, and importantly because it's signals will cover (i.e. reach) the targeted audience.

Covering the target audience is deemed essential, and since many applications of radio frequency (RF) communication target an audience existing within a relatively small geographic area, often coverage is not a problem. For example, it is common to broadcast music or news over a pre-selected frequency to all areas of an office building. Pre-selection of the frequency and pre-tuning of the receivers to that frequency is a relatively easy process. Another example of an RF communication within a relatively small area is a radio controlled car that is set to receive signals broadcast over a pre-selected frequency. Yet another example is taught by U.S. Pat. No. 6,298,218 to Lowe et al. (October 2001). The '218 patent targets audiences within a few feet of the transmitting device. This is exemplified by an athletic club environment in which a user device receives different broadcasts on different frequencies depending on his proximity to specific pieces of gym equipment having transmitters. Thus, those applications that target audiences over a relatively small area typically work well with pre-selection of the frequency and the station. Coverage becomes an issue and complications arise, however, when the target audience is spread over an area that encompasses more than one frequency, station, and/or band. These complications are due in part to the necessity to pre-select many, perhaps hundreds or thousands, of frequencies and stations in order to cover the entire target audience. Thus, pre-selection of frequencies becomes extremely burdensome when a wide spread audience has been targeted.

The need to employ several stations simultaneously is addressed by U.S. Pat. No. 4,517,562 to Martinez (May 1985), however the '562 patent still does not solve or even recognize problems related to the difficulty of scheduling and coordinating communications over a wide spread area. These problems are exacerbated by competition for available RF spectrum and perhaps the distance between a data provider and a data recipient.

There is a need for systems and methods which facilitate use of radio signals to communicate to devices that may be spread over a relatively large area.

A system and method of tracking and reselling inventoried items is disclosed. This method includes assigning an audit code to an incoming inventoried item, wherein the audit code comprises a manual audit code and an automated audit code; auditing the incoming inventoried item to assess the incoming inventory item as such for one or more of, for example, the destruction, demanufacture, resale, recondition, storage, and redeployment; sending the incoming inventoried item to one of a redeployment, a demanufacture, a recondition, a resale, a storage, and a destruction in accordance with the auditing; manually updating the manual audit code in accordance with the auditing and the sending; providing, after the sending and the manually updating, redeployment or resale of at least a portion of the incoming inventoried item audited as suitable for at least one of demanufacture, resale, recondition, and redeployment; and, finally updating the manual audit code based upon the information provided to the system.

Further, a system and method of reselling inventoried items is disclosed. This method includes auditing the incoming inventoried item to assess the incoming inventory item as suitable for resale; making the incoming inventoried item available for auction in accordance with the auditing; auctioning the incoming inventoried item by at least one of a line item auction and a lot auction; disposing of the incoming inventoried item, upon completion of the auctioning, in accordance with an outcome of the auctioning; and, tracking the disposing, wherein the tracking updates a code associated with the auditing.

A system for tracking and disposition of inventoried items is additionally included in the present invention. The system includes an audit code assigner that assigns a manual audit code and an automated audit code to the inventoried item, an auditor that audits the incoming inventoried item to assess the incoming inventory item as suitable for one or more of destruction, demanufacturing, resale, reconditioning, storage, and redeployment, at least one of a redeployer, a demanufacturor, a reconditioner, a reseller, a storer, and a destructor associated with the auditor, and at least one updator that manually updates the manual audit code at each of the audit code assignor, the auditor, and the at least one redeployer, demanufacturor, reconditioner, reseller, storer, and destructor.

Thus, the present invention provides an inventory tracking system and method that tracks and audits the status of all items within the inventory tracking system, including disposed items, and that tracks separately, but in communication with the inventory tracking system, auction items, items redeployed, reconditioned or for sale, or items destroyed.

It is to be understood that the figures and descriptions of the present invention have been simplified to illustrate elements that are relevant for a clear understanding of the present invention, while eliminating, for the purposes of clarity, many other elements found in a typical inventory tracking system.

Those of ordinary skill in the pertinent art will recognize that other elements are desirable and/or required in order to implement the present invention.

SUMMARY OF THE INVENTION

The present invention is directed to systems and methods of delivering data from a source to a remote device in which a network node, different from the source, is employed to select frequencies and regional broadcast stations. Selection may be partly based on scheduling parameters including an availability of RF spectrum of a plurality of regional broadcast stations. Preferred embodiments utilize AM and FM sub-carrier bands, TV, Satellite, and Cellular bands.

It should be appreciated that the inventive subject matter is especially useful for remotely providing additional functionality and content, and remotely patching and updating software. Additionally contemplated uses include limiting functionality, remote programming, providing monetary value (e.g. updating a debit card), providing dynamic content including advertisements (e.g. to a smart card or digital billboard) and motion & audio instruction, providing localization of consumer appliances (as to date, time, etc . . . ), providing self-locating instructions (positional information), remotely enhancing product features, and providing commands that give products infinite dynamic behaviors (e.g. alarm clock buzzer sound, toy motions & sounds, and digital calendar pictures of the day that changes forever).

Benefit to a consumer or user of a remote device may be provided by: enabling the user to realize post purchase value of the remote device; ensuring up-to-date status of a remote device, enabling remote fixing of bugs and potential bugs; lowering the cost of a remote device by eliminating the need to include all of the features or data at time of purchase; and lowering the cost of updating a remote device. In turn, manufacturers may also benefit, because they are able to decouple the hardware development timelines from software development timelines, realize re-occurring revenues, and offer their customers a dynamic product that is less quickly obsolete.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
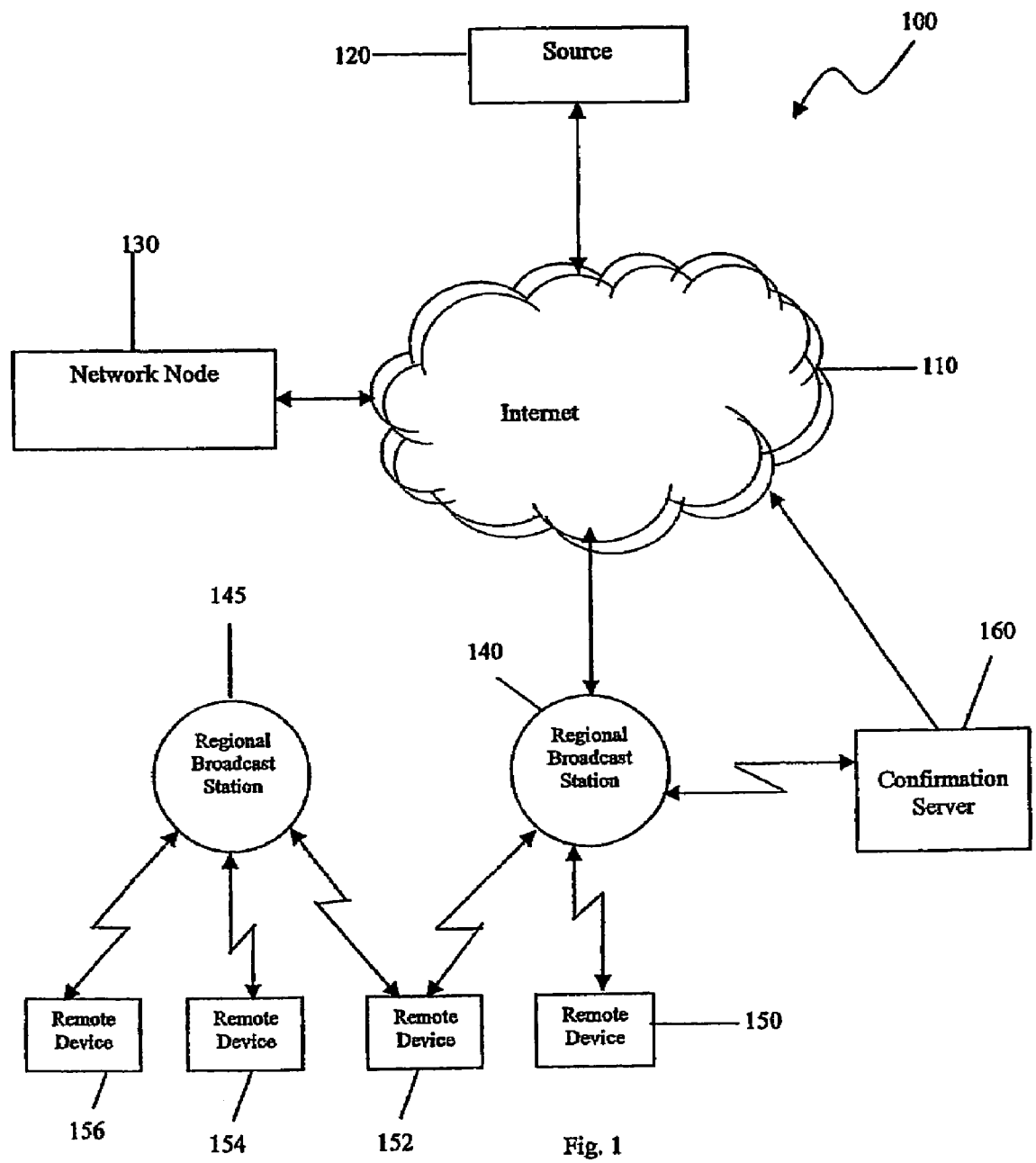
FIG. 1 is a schematic showing a basic flow of data.

Referring first to FIG. 1, a basic flow of data 100 includes a source 120, a network node 130, a regional broadcast station 140, and a remote device 150.

A source 120 may be defined as any entity that provides data to the network node 130 for communication to a remote device 150. While a preferable class of source is a manufacturer or supplier of a remote device, it should be understood that this is not intended to be a limitation. A source may be a user of a remote device, or a third party such as an advertising agency that has no direct relation to the manufacture, distribution, or sale of a remote device. A source may simply be an entity desiring to get information onto the remote device. Among the many contemplated sources are manufacturers, distributors, and retailers of remote devices, advertisers, news services, casinos, automobile dealers, and software companies.

A network node 130 generally consists of a plurality of servers that are preferably Web-based (i.e. coupled to the Internet) and centralized, but may even be distributed. Servers, including RAID drives, may be geographically distributed and mirrored.

Whether a device classifies as a network node 130 generally depends upon functionality. Since scheduling of broadcasts and selecting of frequencies are functions of a network node 130, a device scheduling broadcasts or selecting frequencies is by definition a network node regardless of other factors such as location. For example, a device that selects a frequency at a regional broadcast station is a network node 130. Some additional functions of a network node are: selection of a broadcasting frequency; selection of a regional broadcast station, management of broadcasts; management of data on the servers; management of data at the regional broadcast stations; additional and alternative scheduling at the regional broadcast station; communication of data to regional broadcast stations; encoding of data into radio signals at both the network node and the regional broadcast station; targeting of devices (e.g. by serial number, lot number, location, demographic information, psychographic information, meta data parameter); confirmation and audit (including $Y^d$ party audit) of actual RF delivery through a feedback loop; providing detailed reporting; dynamically pricing based on availability or other criteria (e.g. Auctions); interfacing applications for 3rd party software integration; and maintaining a subscriber (source) and consumer (remote device user) web interface. A network node 130 is also responsible for partnering with market leaders (e.g. in the sale of electronics and broadcast of RF signals), and an important related task is the establishment of regional broadcast stations 140 that can cover target markets.

FIG. 1 depicts a preferred flow of data in which data is communicated from a source 120 to a network node 130 to a regional broadcast station 140 to a remote device 150. In addition to data that has been supplied by a source 120, communication(s) to a regional broadcast station also may expressly or impliedly include a frequency and an identification of a regional broadcast station 140. It should be noted that communications also generally include additional information such as header or address information.

Data (not shown) advantageously enters the system as a result of a communication between a source 120 to a network node 130, and this communication is likely an asynchronous communication of digital data over the Internet. In a preferred class of embodiments, a source 120 accesses a network node managed web page (not shown) in order to introduce data. Within a web page a source may order goods and services such as functionality and content. A recent song, newly developed function, and software patches are examples of goods and services that may be ordered on a network node's web page. It should be noted that data corresponding to goods and services ordered may be entered in a web page managed by an entity other than a network node 130 (i.e. a third parry web page), and in fact, a web page may not be needed at all. Although data is likely to eventually arrive at a network node 130, this is not a requirement, since data may be communicated directly from a third party to a regional broadcast station based on a schedule developed by a network node 130.

Preferably, data that flows to a regional broadcast station 140 traverses wired and/or wireless paths of the Internet, and data that flows from a regional broadcast station 140 traverses wireless paths. It is contemplated that data sent to a regional broadcast station 140 is either pre-encoded into RF signals at a network node 130 or is encoded into RF signals at a regional broadcast station 140. Pre-encoding and encoding may include oscillating (i.e. generating sinusoidal signals at a certain frequency and amplitude) and preparing data for communication pursuant to known CDMA, TDMA, GSM, and GPRS technologies. Additionally it is contemplated that more than one broadcast may be utilized in coordination, (a process known as Multiplexing) to disseminate RF encoded data that may be unreasonably large for a single primary or sub-carrier channel to accommodate.

Data typically includes content data, software data, Meta data, and target data, and may also include other types of appropriate information and instructions. More specific exemplary types of data include audio, video, images, advertising, XML, XLS, private and public keys and digital signatures, text, and numeric data. It should be pointed out that data may have a variety of purposes many of which are described in "Summary" above.

A Meta data parameter, preferably stored on a remote device 150 or a device housing a bridge chip (not shown), may be set as a result of a request from a user of the remote device. A value of a Meta data parameter may be used to determine if data is accepted by a remote device 150. For example, a toy that speaks Spanish (and having a Meta data parameter to indicate Spanish) would probably ignore an English language update based on a value of a Meta data parameter. Thus, whether data is accepted or rejected may be a 15 function of a Meta data parameter.

An access parameter (not shown) may be used to control whether a remote device 150 receives a broadcast communication. In embodiments that utilize an access parameter, a user may submit a request to set the access parameter, which generally resides on a remote device. Such a request is typically submitted to a network node 130 and/or a source 120. Thus, a broadcast communication may include a unique identifier (e.g. serial number) of a remote device 150, and the remote device 150 may receive the communication as a function of a value of the access parameter. While this example targets a single remote device, no requirement should be inferred that access parameters operate with only a single remote device, and in fact communications may target multiple serial numbers or lot numbers.

Another aspect includes broadcasts that maybe overlapped to increase the probability of a successful communication. For example, a single remote device may be within range of more than one regional broadcast station 140, and therefore, each station within range may issue a "duplicate" transmission. This may be especially helpful should a regional broadcast station 140 go down or have problems with interference.

With respect to a regional broadcast station 140, it is contemplated that such stations are those capable of broadcasting radio signals within AM, FM, TV (NTSC, DTV in N. America, PAL and DVB in some other countries), Cellular/PCS, and Satellite bands. A key function administered by a network node 130, but preferably performed at a regional broadcast station 140, is encoding of the data into RF signals that may be broadcast as radio waves having a broadcast frequency matching the network node selected frequency. An RF generator would likely be employed to encode the data for RF broadcast.

Each regional broadcast station is typically granted a range of RF spectrum (e.g. about 200 KHz for primary FM radio stations). In this example, of this 200 KHz, many stations allocate a substantial amount of this range for the primary channel and reserve enough power for several sub-carrier bands (e.g. 57 kHz RBDS, 76 kHz DARC, 67 kHz, and 92 kHz). It is anticipated that both primary and sub-carrier channels will be utilized to transmit data.

A regional broadcast station 140 likely contracts with a network node 130 to broadcast data. It is preferred that a plurality of regional broadcast stations be contracted such that a substantial geographic area is covered. From among the plurality of regional broadcast stations, a set of available frequencies is compiled. A set of available frequencies generally comprise the frequencies made available by regional broadcast stations for remote broadcasting of data. In addition to a frequency, other information will likely be included in a set of available frequencies. Such data may comprise a regional broadcast station identifier, power (wattage), transmitter location, range, and performance related information.

When a regional broadcast station receives a selected frequency from a network node, an opportunity is generally provided for the selected regional broadcast station to override the selected frequency to an alternate or even to decline to make a broadcast all together. Decisions to select an alternate or decline to broadcast are preferably made automatically by network node software residing at a remote broadcasting station and may be based upon local factors. Some contemplated embodiments also include a provision for manual (i.e. human) intervention with regard to selecting an alternate and declining to broadcast. In any case, decisions made at a regional broadcast station are transmitted back to a network node for inclusion in a scheduling process.

A remote device 150 may be typified by a toy, a home appliance, a consumer entertainment electronic, a gambling device, a telematics related device, an advertisement display, and a smart card. It should be obvious that a plurality of remote devices may exist over a wide geographic area (i.e. thousands of miles). The following is a brief list of some contemplated remote devices:

Toys
Infant/Preschool
Dolls
Vehicle
Male Action
Games/Puzzles
Activities Plush
Ride Ons
Consumer Entertainment Electronics Video
Cassette Recorder (VCR)
Compact Disk (CD) Player
Digital Video Disc (DVD) Player
Television (TV)
Digital Television (DTV)
High Definition Television (HDTV)
Personal Video Recorder (PVR)
Set Top Box (Cable 1 Satellite)
Super Audio CD (SACD) Player
Portable Audio Players
MP3 Players Video
Games
PDA's
Laptops
Mobile Phones
Smart Card
Universal Card (more than one function)
Bank Card
Credit Card
Coupon Card
Phone Card
Bluetooth Card
802.11 a Card
802.11b Card Any credit card size with any embedded Smart Chip
 Telematics Devices
Auto Stereos
Auto Navigational Systems
Auto Computer Systems
Auto Entertainment Systems
Auto Communication Systems
Auto Advertising Systems
Auto Diagnostic Systems
Auto Information Systems
Auto Traffic Systems
 Advertisement Displays
Billboard
Bulletins
Posters
Street Furniture
Hotel Displays
Sporting Event Displays
Live Entertainment Venue Displays
Airport Displays
Convenience Store Posters
Mall Displays
Mass Transit Displays
Mobile Ads
Modems
 Home Appliances & Systems
Washer & Dryer
Refrigerator
Lighting Systems
Watering Systems
Pool/Spa Systems
Security Systems
Microwave Oven
Air Conditioning Systems
Heating Systems
Telephone Systems An important aspect of a remote device 150 is a resident (i.e. local) RF receiver. A resident RF receiver should be capable of either scanning for active frequencies or being set for one of a plurality of channels. Preferably a receiver will scan for active frequencies, and in this capacity it is important to understand that the scanner may be limited to frequencies that it has a right to access (i.e. under agreements with regional broadcast stations). As such, it is preferred that an RF receiver is capable of being updated remotely by RF broadcast.

A chipset (e.g. E-PROM chip) residing in the remote device is preferably able to control the RF receiver, parse incoming data, and be capable of triangulation and even control of data dissemination. Of course, a primary function of a chipset is to allow a remote device to gain additional functionality through long-range RF communication. Another aspect of the inventive subject matter includes an ability to transmit short range communications (e.g. 802.11a, 802.11b, and Bluetooth) to enable tracking and confirmation of transmissions, and to rebroadcast transmissions to other remote devices within range.

With reference to a remote device that comprises a smart card, advertising may be communicated to the smart card. One particularly contemplated embodiment includes a smart card that receives coupon information that may be displayed and redeemed at a store by interaction with the smart card. Obviously, a smart card may receive other types of data including an available cash balance.

It is contemplated that confirmation and verification of an RF broadcast may be accomplished using a confirmation server 160 or a plurality of confirmation servers that monitor broadcasts and collect feedback related to broadcasts. Feedback may be reported directly to a network node 130 (via Internet or other means). A confirmation server 160 that receives an appropriate RF broadcast may send RF decoded data to a network node 130, which it in turn compares to broadcast data that was sent via RF. Consequently, a network node 130 may confirm accuracy and/or success of a broadcast both in terms of content and location. Alternatively, a network node may enable $3^{rd}$ party auditing.

Another manner of monitoring and collecting feedback includes a confirmation server 160 or collection of servers that receive incoming messages from remote devices 150-156 that are equipped with an ability to transmit data either directly or indirectly back to a network node 130. Transmissions from a remote device may include short range RF communications using bluetooth, 802.11, and GPRS.

Information confirming an RF communication may include an acknowledgement of receipt, a date and time received, as well as other useful information in response to the remote devices receipt of RF data. Failure of a communication may indicate that a remote device is inoperable or no longer within the geographical range of the regional broadcast station.

FIG. 1 may be readily understood by reference to a specific example. Consider a Britney Spears doll that sings and dances as a function of local instructions within the doll. A user purchasing the doll may register with a toy company, service provider (a network node), or third party to receive new songs and dances as they become available. Upon availability, data corresponding to a new song and/or dance maybe sent from the toy manufacturer (or other source) to the network node. The network node, having information pertaining to scheduling and selection, schedules delivery and selects frequencies and regional broadcast stations that reach a majority if not all of the registered Spears dolls. A two step process is preferably used to update registered dolls—first, registered dolls are remotely programmed to recognize incoming data; second, data is broadcast in accordance with the schedule and at the selected frequencies. Dolls which have been remotely programmed to receive the data are updated with data corresponding to the new song and dance.

Figure 2:
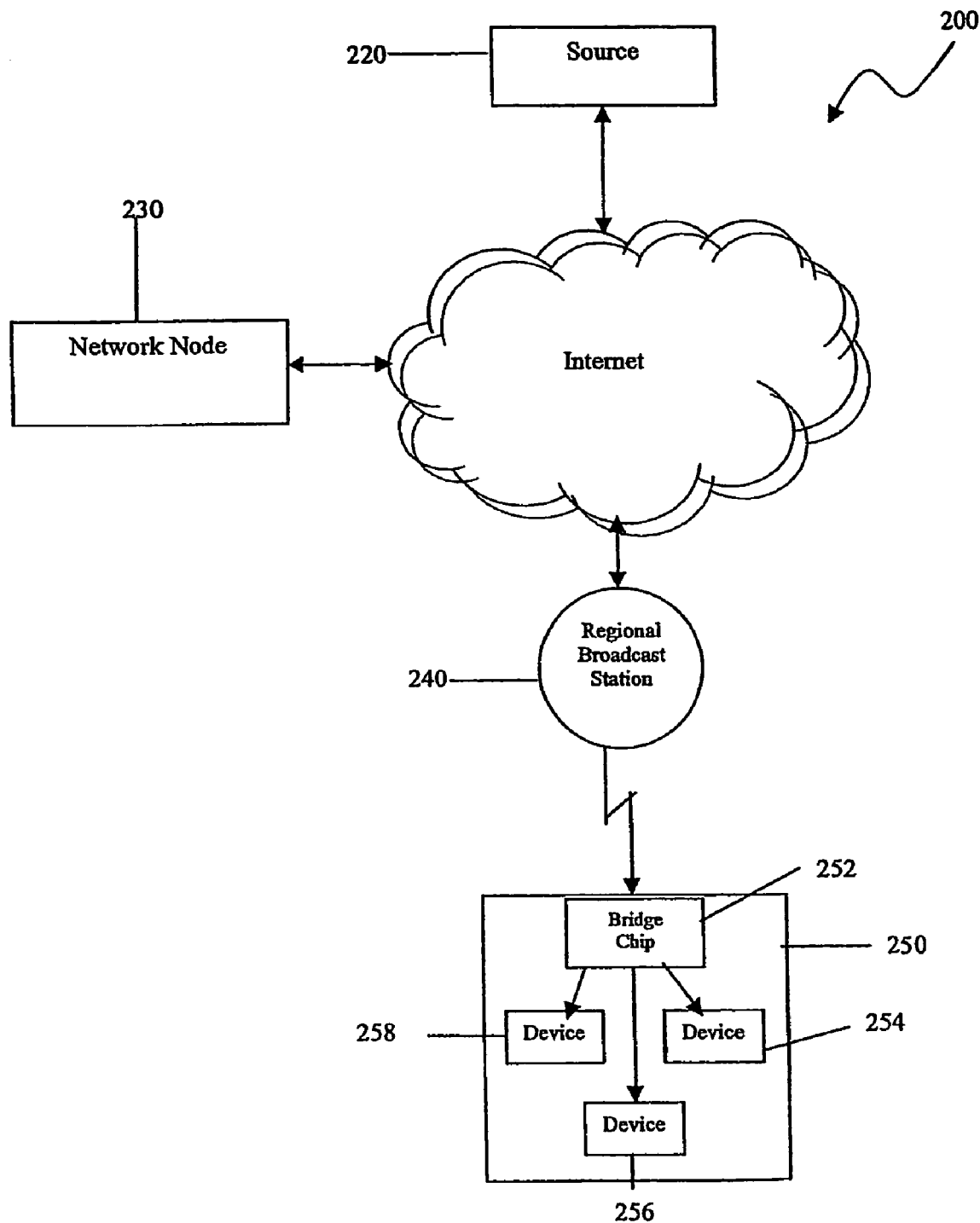
FIG. 2 is a schematic of an embodiment utilizing a bridge chip.

Another aspect of the subject matter is a long range RF to short range RF bridge depicted in FIG. 2. A bridge chip 252 is typically located within a relatively small physical area 250 (e.g. a house or office building) that has remote devices 254-258 within short range proximity. Specifically, a bridge chip 252 may be located within one of a number of electronic devices such as a set top box or computer. In regard to its placement along paths of communication, a bridge chip 252 is preferably located between a regional broadcast station 240 and a remote device 254-258.

In any case, a bridge chip 252 may receive a long range RF communication and convert it for short range dissemination. An embodiment of this aspect may include a bridge chip 252 located within a set top box (not pictured) that communicates to remote devices located throughout a house. Such short range communication may be by radio waves, microwaves, infra red, sound, and other wireless and even wired paths.

An additional related concept involves a bridge chip 252 that receives long range RF signals, and communicates with remote devices via a "hard wired" connection. It is contemplated that remote devices may have ports (i.e. USB port) for connecting directly to a device housing a bridge chip 252.

Figure 3:
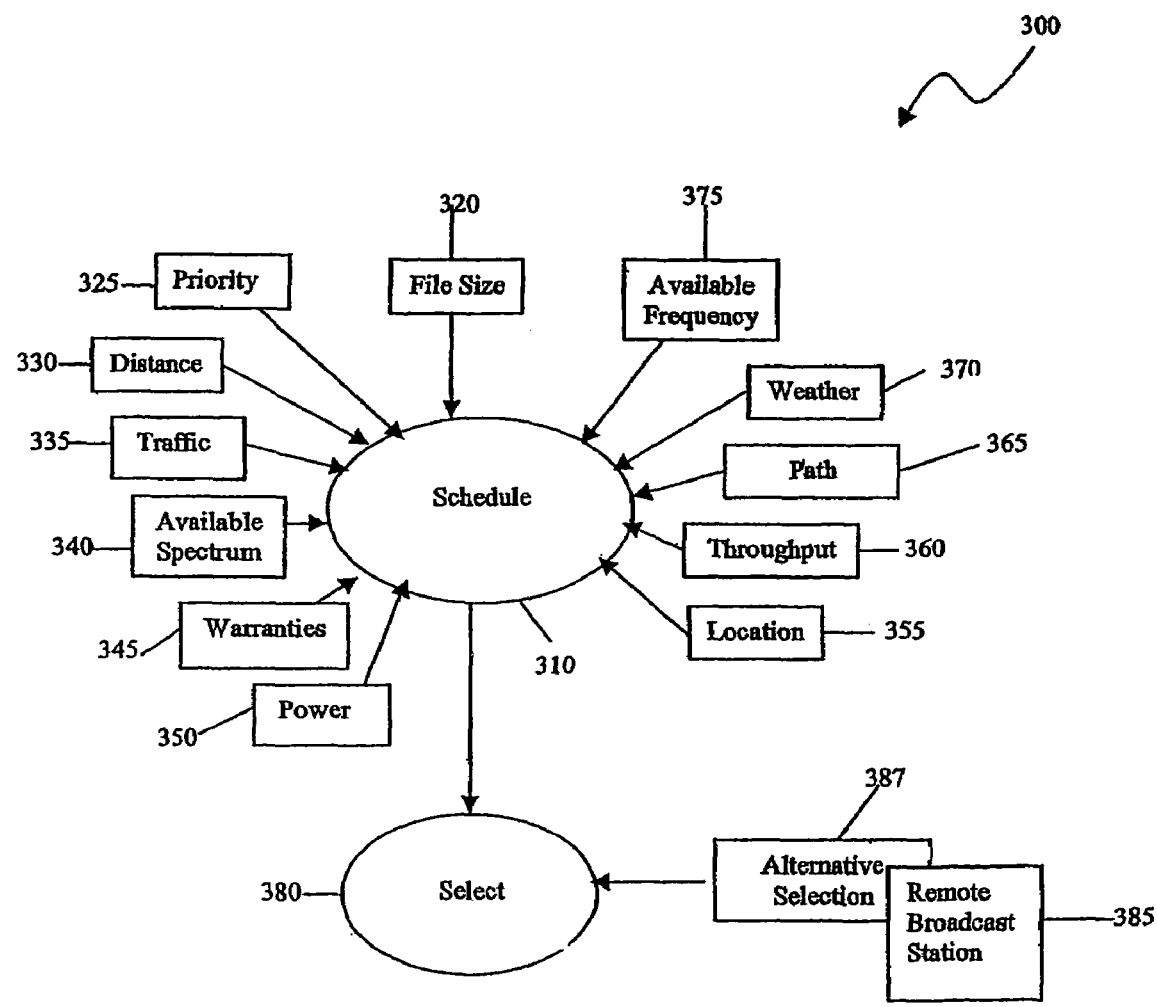
FIG. 3 is a schematic of a scheduling system and method.

Scheduling and selection information depicted in FIG. 3 include file size 320, priority 325, distance 330, traffic 335, available spectrum 340, warranties 345, power 350, location 355, throughput 360, path 365, weather 370, and available frequency 375.

Scheduling 310, selection 380, and alternative selection 387 are all typically performed by a network node. Selection is generally a result of scheduling and other factors including alternative selection which is typically performed at a remote broadcasting station 385.

File size 320 refers to a data file. Of course files size maybe optimized by splitting one file into multiple files. Priority 325 refers to importance of a communication which may be related to compensation, contracts and agreements, and warranties.

Distance may have multiple references. Preferably, distance refers to a distance between a regional broadcast station and a remote device, however distance may additionally or alternatively refer to a distance between a network node and a remote device, a distance between a regional broadcast station and a bridge chip, and a distance between a network node and a regional broadcast station.

Traffic 335 typically refers to contention for communication paths which may include Internet and other network paths as well as primary and sub-carrier bands of AM, FM, TV, Satellite, and Cellular. Traffic may also include contention for network resources including those of a network node and a regional broadcast station.

Available spectrum 340 refers to frequencies of the electromagnetic spectrum that have been allocated by the FCC and by regional broadcast stations for use by a network node. Warranties 345 typically are guarantees as to promptness and success of communications. Power 350 refers to wattage of a selected frequency. Location 355 refers to a geographic location, especially in relation to a remote broadcasting station. Throughput 360 may refer a transfer rate for the selected or alternative frequency and path 365. Path 365 will typically be a communication channel. Weather 370 is meteorological condition that may interfere with RF communication. Available frequency 375 is a set frequencies that are available to a network node for use. Available frequencies may include a frequency modulation value, an amplitude modulation value, and an identity of an associated remote broadcasting station.

Selection of a frequency involves assessment of a schedule as well as other factors, particularly those related to current load for a regional broadcast station. Information related to radio frequency communication including specific band ranges may be found at www.fcc.gov and http://www.fcc.gov/oet/fags/freqchart.html.

Thus, specific embodiments and applications of dynamic selection and scheduling of radio frequency communications have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. A manager for playing of broadcast specific information, comprising:

a managing node that is at least partially resident at a radio broadcast point, wherein the managing node includes a plurality of inputs for receipt of the broadcast specific information from at least two sources, wherein the managing node records the broadcast specific information entering at least two of the plurality of inputs for eventual broadcast from the radio broadcast point; and at least one broadcast non-specific information input associated with the managing node, wherein at least one of a format, play time, and play type of the broadcast specific information are varied in accordance with the broadcast non-specific information, and wherein the varied broadcast specific information is broadcast from the radio broadcast point to a remote device configured to broadcast the varied broadcast specific information, wherein, the managing node is configured to perform operations including:

receiving feedback describing information that was broadcast by the remote device, and comparing the information that was broadcast by the remote device with the varied broadcast specific information to identify differences between the information that was broadcast and the varied broadcast specific information.

2. The manager of claim 1, wherein the varied broadcast specific information broadcasts are logged.

3. The manager of claim 1, wherein the plurality of inputs for receipt of the broadcast specific information includes at least one networked computer input.

4. The manager of claim 1, wherein the at least one broadcast non-specific information input includes at least one networked computer input.

5. The manager of claim 1, wherein the broadcast specific information, once recorded, is locally available.

6. The manager of claim 1, wherein the broadcast specific information, once recorded, is remotely available.

7. The manager of claim 1, wherein the broadcast specific information, once recorded, is available to create an audio campaign.

8. The manager of claim 1, wherein the broadcast specific information, once recorded, is available to create a visual campaign.

9. The manager of claim 1, wherein the broadcast specific information is editable in accordance with the broadcast non-specific information.

* * * * *

UNITED STATES PATENT AND TRADEMARK OFFICE
CERTIFICATE OF CORRECTION

PATENT NO. : 7,660,557 B2  Page 1 of 1
APPLICATION NO. : 11/130655
DATED : February 9, 2010
INVENTOR(S) : Steelberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Thirtieth Day of November, 2010

David J. Kappos
*Director of the United States Patent and Trademark Office*